UNITED STATES PATENT OFFICE.

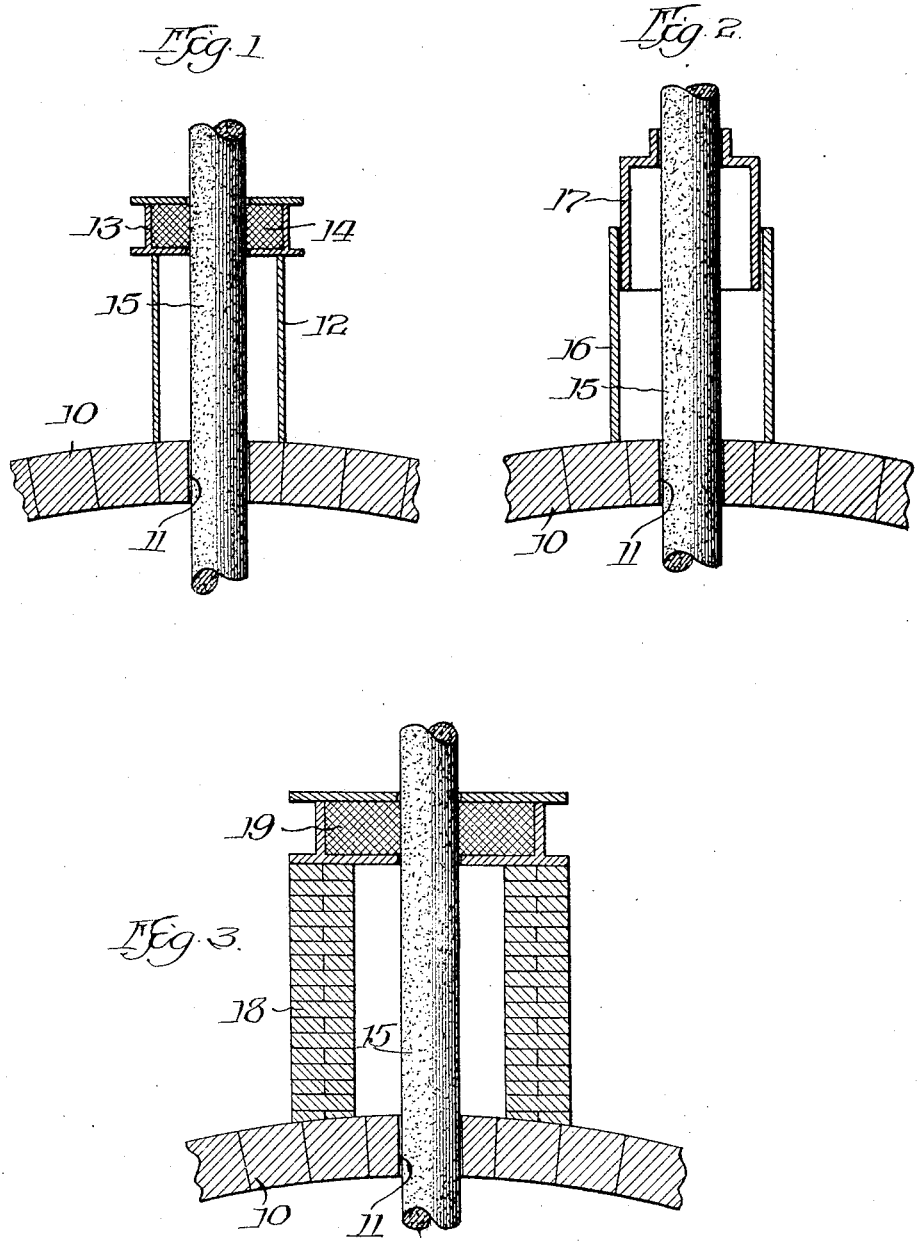

VICTOR STOBIE, OF DUNSTON-UPON-TYNE, ENGLAND.

ELECTRIC HEATING AND MELTING FURNACE.

1,305,177.  Specification of Letters Patent.  Patented May 27, 1919.

Application filed March 28, 1918. Serial No. 225,248.

*To all whom it may concern:*

Be it known that I, VICTOR STOBIE, a subject of the King of England, and resident of Dunston-upon-Tyne, in the county of Durham, England, have invented certain new and useful Improvements in Electric Heating and Melting Furnaces, of which the following is a specification.

My invention relates to electric furnaces and particularly to means for reducing the consumption of the electrodes thereof.

In electric furnaces of the type in which the electrode is fed into the furnace through an opening in one wall thereof, a considerable portion of the electrode outside of the furnace becomes heated to an oxidizing temperature due to internal conduction of heat from the portion within the furnace. The portion outside of the furnace is thus exposed to the oxidizing influence of the surrounding air and is reduced in diameter, and as the electrode is intermittently reciprocated, the reduction in diameter is irregular. This irregularity prevents effective sealing of the electrode without constant attention.

An object of my invention is to provide a simple device for sealing the electrode which shall be adapted to act thereon at a point above that at which the temperature is at an oxidizing degree.

A further object is to effectively exclude atmospheric air from the highly heated portion of the electrode which projects outside of the furnace wall. This prevents reduction of the carbon, assures a constant diameter of electrode at the point of entrance to the furnace and enables an effective seal at that point. In effect, therefore, I have provided a double seal for the electrode, the outer seal serving to exclude the atmosphere and prevent an oxidizing action on the projecting heated portion of the electrode.

The invention will be more readily understood by reference to the accompanying drawings, wherein, Figure 1 is a vertical sectional view showing the application of my improvement to a conventional furnace, and, Figs. 2 and 3 are similar views showing modifications of this construction.

In the drawings, the top wall or roof of the furnace is indicated at 10, an aperture 11, being provided of the correct size to accommodate an electrode such as commonly used in furnaces of this type. As the heat in the furnace and particularly at the arc is very high the portion of the electrode within the furnace becomes highly heated and by internal conduction some heat is transmitted to the portion of the electrode outside of the wall 10, at least sufficient to raise the temperature to the point of oxidation. In order to avoid oxidation and loss of a portion of the electrode I exclude the atmosphere from the heated portion by surrounding the same, as in Fig. 1, with a metal cylinder 12, fitted upon the roof 10, and at its upper end closed by a metal box 13, filled with asbestos rope 14, or similar refractory material. This material may be rather tightly packed around the electrode 15, and serves to effectually exclude atmospheric air from the heated portion of the electrode. In this manner the electrode is not reduced in diameter and may be sealed also at its point of entrance into the furnace.

In the construction of Fig. 2, the shell 16, is the same but instead of the box, I secure a sleeve 17, to the electrode, the sleeve moving with the electrode and sliding downwardly within the shell.

The construction of Fig. 3 is similar to that of Fig. 1, except in that the shell 18, is built of bricks upon the roof 10, of the furnace. The sealing box or gland 19, is the same as that shown in Fig. 1. The height of the shell or cylinder will preferably be determined by the extent of the electrode which in practice is heated to oxidizing temperature.

Other modifications than those herein shown will readily suggest themselves to those skilled in the art and I do not wish to be limited other than as indicated in the appended claims.

I claim:

1. In an electric furnace, the combination with a wall thereof having an opening, of an electrode closely fitting said opening, a shell erected around said opening, and electrode packing means carried by the shell and located at such distance from the furnace wall as to be outside of the point at which the electrode becomes heated to an oxidizing temperature, substantially as described.

2. In an electric furnace, the combination with the roof having an opening, of an electrode closely fitting said opening, a housing erected around the opening, means at the extremity of the housing for packing the electrode, thereby providing a closed chamber above the furnace from which the direct heat of the furnace and atmospheric air are excluded, the packing means being located at such distance from the furnace as to be above the point at which the electrode becomes heated to an oxidizing temperature, substantially as described.

3. The combination with an electric furnace and an electrode, of means providing a double seal for the electrode, the inner seal being at the point of the entrance of the electrode into the furnace, the outer seal being at such distance from the furnace as to be outside of the point at which the electrode becomes heated to an oxidizing temperature, the space around the electrode between the seals being closed to the atmosphere, substantially as described.

Signed at Newcastle-upon-Tyne, England, this fifth day of March, 1918.

VICTOR STOBIE.

Witnesses:
A. MITCHINSON,
A. J. R. BROADBENT.

Copies of this patent may be obtained for five cents each, by addressing the "Commissioner of Patents, Washington, D. C."